(12) United States Patent
Kim et al.

(10) Patent No.: US 12,134,369 B2
(45) Date of Patent: Nov. 5, 2024

(54) CONSOLE HAVING MULTI-STORAGE CONFIGURATION

(71) Applicants: Hyundai Motor Company, Seoul (KR); Kia Corporation, Seoul (KR); Ecoplastic Corporation, Gyeongju-si (KR)

(72) Inventors: Hye Kyung Kim, Suwon-si (KR); Joo Hwa Kim, Hwaseong-si (KR); Dae Ig Jung, Suwon-si (KR); Seung Hyeok Chang, Suwon-si (KR); Sung Ki Lee, Iksan-si (KR); Dong Jin Park, Daegu (KR)

(73) Assignees: HYUNDAI MOTOR COMPANY, Seoul (KR); KIA CORPORATION, Seoul (KR); ECOPLASTIC CORPORATION, Gyeongju-si (KR)

( * ) Notice: Subject to any disclaimer, the term of this patent is extended or adjusted under 35 U.S.C. 154(b) by 454 days.

(21) Appl. No.: 17/643,768

(22) Filed: Dec. 10, 2021

(65) Prior Publication Data

US 2022/0185193 A1 Jun. 16, 2022

(30) Foreign Application Priority Data

Dec. 11, 2020 (KR) .................. 10-2020-0172959

(51) Int. Cl.
*B60R 7/04* (2006.01)
*B60N 2/75* (2018.01)
*B60N 3/10* (2006.01)
*B60R 11/00* (2006.01)

(52) U.S. Cl.
CPC ............... *B60R 7/04* (2013.01); *B60N 2/793* (2018.02); *B60N 3/102* (2013.01); *B60R 2011/0007* (2013.01)

(58) Field of Classification Search
CPC ... B60R 7/04; B60R 2011/0007; B60N 2/793; B60N 3/102
USPC ........................... 296/24.43; 248/311.2, 926
See application file for complete search history.

(56) References Cited

U.S. PATENT DOCUMENTS

| | | | | |
|---|---|---|---|---|
| 4,892,281 | A * | 1/1990 | DiFilippo | B60N 3/102 248/240.1 |
| 5,087,008 | A * | 2/1992 | Miller | B60N 3/102 248/311.2 |
| 5,232,262 | A * | 8/1993 | Tseng | A47C 7/54 297/188.17 |
| 5,248,183 | A * | 9/1993 | Gignac | B60N 3/102 248/311.2 |

(Continued)

FOREIGN PATENT DOCUMENTS

KR 101574440 B1 11/2015

*Primary Examiner* — Jason S Morrow
(74) *Attorney, Agent, or Firm* — SLATER MATSIL, LLP

(57) ABSTRACT

An embodiment console having a multi-storage configuration includes a console body configured to be disposed inside a vehicle, a first storage assembly located in the console body, and a second storage assembly held in the console body and configured to be withdrawn by deploying at least a portion of the console body, wherein the second storage assembly includes a housing including at least one surface of the console body and configured to be deployed to form a second storage region, a first support located at an upper end of the second storage region, and a second support configured to be deployed in an extension direction of the second storage region.

19 Claims, 5 Drawing Sheets

(56) References Cited

U.S. PATENT DOCUMENTS

| | | | | | |
|---|---|---|---|---|---|
| 5,330,146 | A | * | 7/1994 | Spykerman | B60N 3/102 |
| | | | | | 224/570 |
| 5,489,054 | A | * | 2/1996 | Schiff | B60N 3/002 |
| | | | | | 297/188.17 |
| 5,791,616 | A | * | 8/1998 | Volkmann | B60N 3/102 |
| | | | | | 297/188.17 |
| 7,891,719 | B2 | * | 2/2011 | Carnevali | B60N 3/12 |
| | | | | | 296/24.34 |
| 7,896,303 | B2 | * | 3/2011 | Yamamoto | B60N 3/106 |
| | | | | | 224/281 |
| 10,189,414 | B1 | * | 1/2019 | Huebner | B60N 2/793 |
| 10,981,484 | B2 | * | 4/2021 | Bone | B60N 3/102 |
| 11,958,396 | B2 | * | 4/2024 | Sang | B60N 3/102 |
| 2007/0051764 | A1 | * | 3/2007 | Sturt | B60R 11/00 |
| | | | | | 224/539 |
| 2010/0314896 | A1 | * | 12/2010 | Skibinski | B60N 3/12 |
| | | | | | 296/24.34 |
| 2016/0059761 | A1 | * | 3/2016 | Bohlke | B60N 3/102 |
| | | | | | 296/37.8 |

* cited by examiner

CONSOLE HAVING MULTI-STORAGE CONFIGURATION

CROSS-REFERENCE TO RELATED APPLICATIONS

This application claims the benefit of Korean Patent Application No. 10-2020-0172959, filed on Dec. 11, 2020, which application is hereby incorporated herein by reference.

TECHNICAL FIELD

The present disclosure relates to a console having a multi-storage configuration.

BACKGROUND

In general, a storage assembly system is installed at various places of the front and rear portions of the interior of a vehicle so that a driver and passengers may safely store beverage cups, beverage cans or beverage bottles in the storage assembly system while drinking beverages.

However, the conventional storage assembly system is configured to be located in an open area at the upper end of a console and, if the width of the console is narrow, only one storage space is provided.

Further, as the structure of a vehicle for providing an open floor space for autonomous driving and a slim-type console have been provided recently, there is a difficulty in preparing a storage space, such as a cup holder.

In addition, a storage assembly mounted integrally on a console has a difficulty in holding a plurality of cups thereon.

The above information disclosed in this Background section is only for enhancement of understanding of the background of the invention and therefore it may contain information that does not form the prior art that is already known to a person of ordinary skill in the art.

Korean Patent Registration No. 10-1574440 describes information related to the present subject matter.

SUMMARY

The present disclosure relates to a console having a multi-storage configuration. Particular embodiments relate to a console having a multi-storage configuration which may provide an additional storage region formed by deploying at least a portion of a housing forming the console in addition to a storage space located on the upper surface of the console.

Embodiments of the present invention can solve problems associated with the prior art, and embodiments of the present invention provide a console having a structure including an additional storage region which may be selectively deployed.

Another embodiment of the present invention provides a storage space formed by deploying at least a portion of one surface of a console.

Yet another embodiment of the present invention provides a storage region having a designated depth using a narrow space inside a console.

One embodiment of the present invention provides a console having a multi-storage configuration, the console including a console body located inside a vehicle, a first storage assembly located in the console body, a second storage assembly held in the console body and withdrawn by deploying at least a portion of the console body, wherein the second storage assembly includes a housing including at least one surface of the console body and deployed to form a second storage region, a first support located at an upper end of the second storage region, and a second support configured to be deployed in an extension direction of the second storage region.

In a preferred embodiment, the console may further include guide parts located inside the housing and configured to move the first support therealong in response to movement of the housing.

In another preferred embodiment, when the housing is moved in a withdrawal direction thereof from the console body, the housing may be moved to a designated position, and thereafter, the first support may face rear ends of the guide parts and then be moved integrally with the housing.

In still another preferred embodiment, when the housing is inserted into the console body to be held in the console body, the first support may be located to face front ends of the guide parts.

In yet another preferred embodiment, the console may further include elastic members located between a rear surface of the first support and an inner surface of the console body.

In still yet another preferred embodiment, the second support may be configured to be inserted into the second storage region when the second storage assembly is inserted into the console body to be held in the console body.

In a further preferred embodiment, the console may further include a link part located between one end of an upper portion of the housing and a rear end of the first support so as to rotate the first support.

In another further preferred embodiment, the console may further include a fixing part located inside the housing and configured to protrude towards an inside of the second storage region.

In still another further preferred embodiment, the second support may be configured to be located adjacent to a lower end of the first storage assembly when the second storage assembly is inserted into the console body to be held in the console body.

In yet another further preferred embodiment, the first support may be configured to be located adjacent to side surfaces of the first storage assembly when the second storage assembly is inserted into the console body to be held in the console body.

In still yet another further preferred embodiment, when the housing is deployed, a movement distance of the second support in a withdrawal direction of the housing from the console body may be longer than a movement distance of the first support in the withdrawal direction of the housing from the console body.

In a still further preferred embodiment, the console may further include rails located inside the console body in a deployment direction of the housing, and configured such that at least a portion of each of side surfaces of the housing is inserted into a corresponding one of the rails.

In a yet still further preferred embodiment, the console may further include a push/pull-type button located on a rear surface of the housing or an inner surface of the console body configured to come into contact with the rear surface of the housing.

In another preferred embodiment, the second support may be configured to be deployed towards a lower end of the second storage region in response to movement of the housing in a withdrawal direction thereof from the console body.

In still another preferred embodiment, the housing may include an upper housing part configured to form at least a portion of an outer surface of the console body and to surround the second storage region formed by deploying at least a portion of the housing, and a lower housing part configured to move along an inside of the console body and to have the first support and the second support located thereon.

In yet another preferred embodiment, the first storage assembly may include an indented area including an opening formed in an upper surface of the console body.

Another embodiment of the present invention provides a console having a multi-storage configuration, the console including a console body located inside a vehicle, a storage assembly held in the console body and withdrawn by deploying at least a portion of the console body, wherein the storage assembly includes a housing including at least one surface of the console body and deployed to form a storage region, a first support located at an upper end of the storage region, guide parts located inside the housing and configured to move the first support therealong in response to movement of the housing, and a second support configured to be deployed towards a lower end of the storage region in response to movement of the housing in a withdrawal direction thereof from the console body.

Other aspects and preferred embodiments of the invention are discussed infra.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

Figure 1:
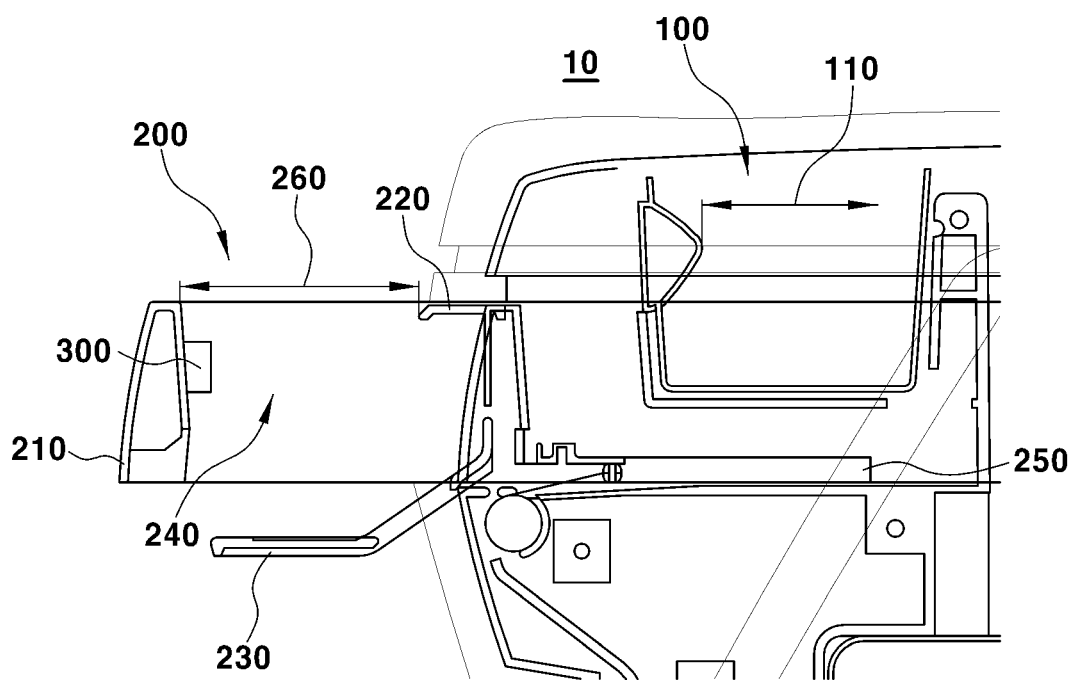
FIG. 1 is a side view of a console having a multi-storage configuration according to one embodiment of the present invention.

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout the several figures of the drawing.

DETAILED DESCRIPTION OF ILLUSTRATIVE EMBODIMENTS

Hereinafter reference will be made in detail to various embodiments of the present invention, examples of which are illustrated in the accompanying drawings and described below. While the invention will be described in conjunction with exemplary embodiments, it will be understood that present description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims.

In the following description of the embodiments, it will be understood that the suffixes "part", "region" and "housing" indicate units for processing at least one function or operation, and may be implemented using hardware or a combination of hardware and software.

Further, in the following description of the embodiments, terms, such as "first" and "second", are used only to distinguish one element from other elements, and these terms should not be construed as being limiting with regard to the sequence thereof.

In addition, in the following description of the embodiments, a length direction, a withdrawal direction, a forward direction or a rearward direction is described based on the direction of a long side of a console. Further, the withdrawal direction means the deployment direction of a housing, and more particularly, means a direction which is set in the console such that the housing is withdrawn from the console.

In the following description of the embodiments, the housing, which is withdrawn in the length direction of the console, will be described, but the withdrawal direction of the housing is not limited to the length direction of the console because the withdrawal direction of the housing may vary depending on the shape and the structure of the console in which the housing is located.

Further, in the following description of the embodiments, "deployment of the housing" means movement of the housing in a direction away from one surface of the console, and "holding of the housing" means the state in which the housing is inserted into the console so as to be held in the console.

Embodiments of the present invention relate to a console having a multi-storage configuration, which includes a first storage assembly including an indented area formed in the upper surface of the console and a second storage assembly formed by deploying at least a portion of the front surface of the console.

FIG. 1 is a side view of a console having a multi-storage configuration according to one embodiment of the present invention.

The console according to embodiments of the present invention includes a console body 10 located inside a vehicle, and a first storage assembly 100 formed as an indented area including an opening formed in the upper surface of the console body 10. Further, the console according to embodiments of the present invention includes a second storage assembly 200 held in the console body 10 so as to be opened and deployed integrally with at least a portion of one surface of the console body 10.

In one embodiment of the present invention, the first storage assembly 100 and the second storage assembly 200 may be formed as cup holders, and may be configured such that a wireless charger is embedded under the rear surfaces thereof, and a switch system for controlling lighting devices, an audio, video and navigation (AVN) system and a display, which are located inside the vehicle, is held thereon.

The second storage assembly 200 includes a housing 210 including at least a portion of the front surface of the console body 10 and extending up to the lower end of the first storage assembly 100 in the length direction of the console body 10. More particularly, the housing 210 may be configured to be deployed in the withdrawal direction thereof or to be inserted into the console body 10 along the console body 10. The housing 210 may be configured to form a portion of the front surface of the console body 10, and more particularly, include the side surfaces as well as the front surface of the console body 10.

In addition to the housing 210, the second storage assembly 200 further includes a first support 220 and a second support 230. The housing 210 is configured such that the front end of the housing 210 has side walls higher than those of the rear end of the housing 210, and a region of the housing 210 having the higher side walls has a second storage region 240.

The housing 210 may be configured to be engaged with rails 250 located on the inner surface of the console body 10 so as to be deployed in the length direction of the console body 10 and, when an electrical signal is applied to the housing 210, the housing 210 may be moved along the console body 10 in the length direction thereof by a driving unit engaged with one end of the housing 210.

The second storage region 240 is formed by an opening passing through the housing 210 in the height direction thereof and the second support 230 located at the lower end of the housing 210, and the second storage region 240 is surrounded by the front and side surfaces of the console body 10. When the housing 210 is deployed, the first support 220 is configured to be located at the upper portion of the rear end of the second storage region 240, and the second support 230 is configured to support at least a portion of the lower end of the second storage region 240.

The first support 220 is configured to be engaged with guide parts 290 located at both inner side surfaces of the housing 210 and, when the housing 210 is deployed forward from the console body 10, the guide parts 290 are moved forward such that the first support 220 is moved by a shorter distance than the movement distance of the housing 210 in the withdrawal direction thereof.

That is, when the guide parts 290 formed integrally with the housing 210 are moved forward from the console body 10, the first support 220 maintains the stopped state thereof at a designated position inside the console body 10 and, when the housing 210 is moved to a distance longer than the length of grooves formed in the guide parts 290, the rear ends of the guide parts 290 come into contact with protrusions of the first support 220. When the housing 210 is additionally deployed in the withdrawal direction thereof in the state in which the first support 220 comes into contact with the rear ends of the guide parts 290, the first support 220 and the housing 210 are integrally moved in a direction away from the upper surface of the console body 10.

In one embodiment of the present invention, the housing 210 may be moved to a length at which the first support 220 is engaged with the rear ends of the guide parts 290, and then be additionally moved in the withdrawal direction of the housing 210 independently of the first support 220. Further, in another embodiment of the present invention, the housing 210 may be continuously moved up to the completely deployed state thereof.

The second support 230 is engaged with the lower portion of the rear end of the housing 210, and is configured to maintain the state of being folded to the inside of the console body 10 in the state in which the housing 210 is held in the console body 10 and to be rotated about the rear end of the housing 210 so as to be located at the lower end of the second storage region 240 when the housing 210 is deployed. That is, the second support 230 is configured to be engaged with the rear end of the housing 210 by a rotary shaft, and to be rotated downward about the rotary shaft so as to form the lower surface of the second storage region 240.

In one embodiment of the present invention, the storage assembly 200 is configured to be held in the console body 10 such that the rear surface of the rear end of the housing 210, on which the second support 230 is located, is located adjacent to the lower end of a first storage region 110, and the front end of the second storage region 240 is spaced apart from the side surfaces of the first storage region 110 by a designated distance. More particularly, the second storage assembly 200 may be configured such that the rearmost end of the second storage region 240 is spaced apart from the side ends of the first storage region 110 by a distance of 40 mm. That is, the first support 220 and the first storage region 110 are located at positions adjacent to each other in the state in which the second storage assembly 200 is held in the console body 10, and an insertion part 260 formed in the housing 210 has the same size as that of an opening formed in the upper end of the first storage assembly 100 when the second storage assembly 200 is deployed.

Further, the uppermost end of the second storage region 240 may be located adjacent to the central portion of the first storage region 110 in the height direction thereof. Therefore, the uppermost end of the second storage region 240 is located at a height corresponding to half the height of a recess forming the first storage region no or a position adjacent thereto when the second storage assembly 200 is deployed.

Figure 2:
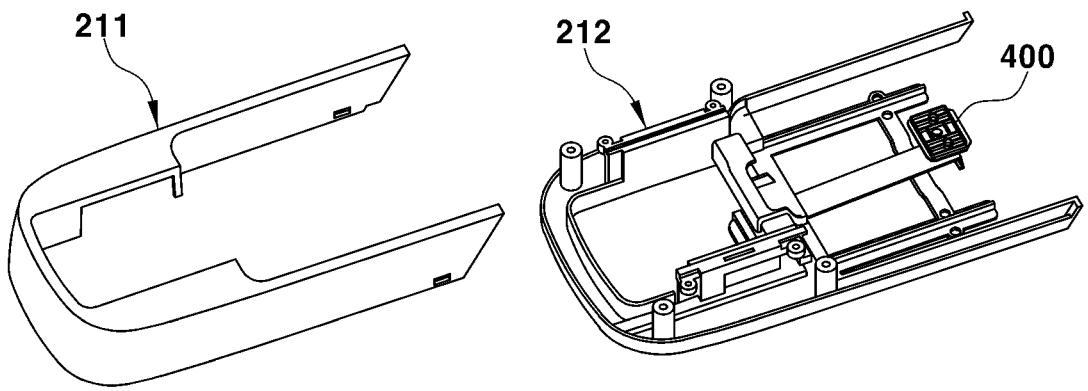
FIG. 2 is a perspective view of a housing of the console according to one embodiment of the present invention.

FIG. 2 is a view illustrating combination relations among the elements of the housing 210 according to embodiments of the present invention.

The housing 210 according to embodiments of the present invention may include an upper housing part 211 configured to form at least a portion of the outer surface of the console body 10 and to surround the second storage region 240 formed by deploying at least a portion of the housing 210, and a lower housing part 212 configured to move along the inside of the console body 10 and to have the first support 220 and the second support 230 located thereon.

The upper housing part 211 is configured to form at least a portion of the outer surface of the console body 10 when the upper housing part 211 is inserted into the console body 10. Further, the upper housing part 211 may be engaged with the lower housing part 212 so that they are integrally deployed in the withdrawal direction of the housing 210.

The first support 220 and the second support 230 are sequentially located at the rear end of the lower housing part 212 in the height direction thereof. More particularly, the first support 220 is located at the top portion of the rear end of the lower housing part 212, and the second support 230 is located at the bottom portion of the rear end of the lower housing part 212. A push/pull-type button 400 is located on a rod extending in the rearward direction of the lower housing part 212 so as to selectively come into contact with the inner wall of the console body 10. More particularly, the push/pull-type button 400 may be configured to be located at an end of the rod extending towards the inside of the console body 10 based on the rear end of the lower housing part 212 with which the second support 230 is engaged.

Figure 3:
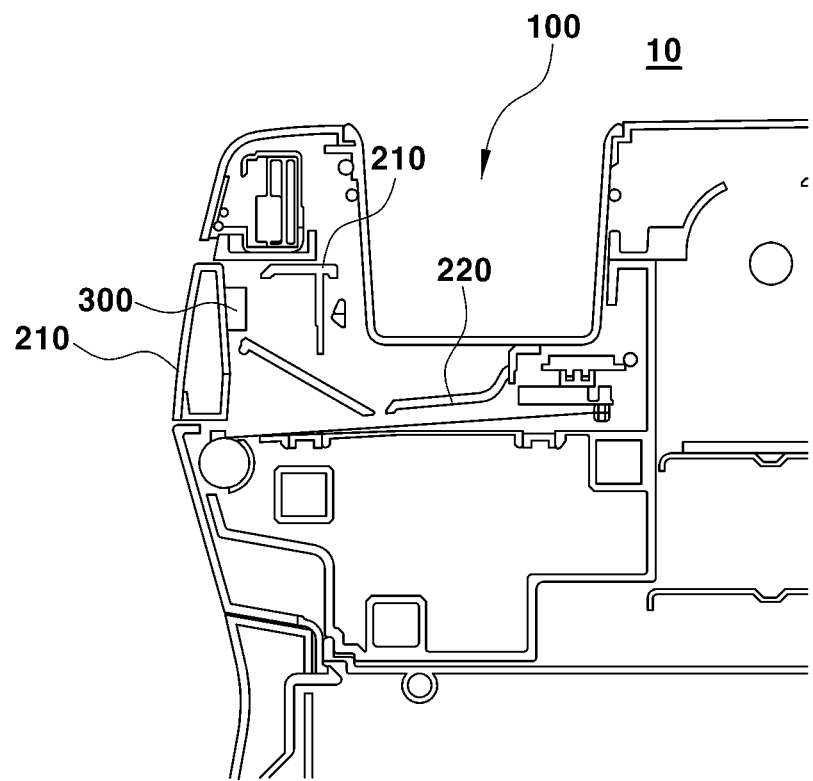
FIG. 3 is a cross-sectional view illustrating the state in which a second storage region of the console according to one embodiment of the present invention is held in a console body.

FIG. 3 is a cross-sectional view illustrating the state in which the housing 210 is held in the console body 10.

As shown in this figure, the housing 210 is located to form the front and side surfaces of the console body 10, and includes the second storage region 240 including the opening formed in the upper portion of the housing 210. The height of the uppermost end of the second storage region 240 is substantially the same as half the height of the recess of the first storage region 110.

The rear end of the first support 220 may be located adjacent to the side surfaces of the first storage region 110, and the second support 230 may be located adjacent to the lower end of the first storage region 110. More particularly, in the state in which the housing 210 is inserted into the console body 10 so as to be held in the console body 10, the second support 230 comes into contact with the console body 10 and thus the front end of the second support 230 is rotated towards the inside of the second storage region 240 so as to be inserted into the second storage region 240. Therefore, the second support 230 is inserted into a narrow space below the lower end of the second storage region 240. More particularly, the first support 220 may be located such that the protrusions located on the side surfaces of the first support 220 come into contact with the front ends of the guide parts 290.

The second storage region 240 is configured such that the rear end thereof is engaged with elastic members 280 located inside the console body 10 and fixed to positions adjacent to the side surfaces of the first storage region no, and the elastic members 280 are configured to apply elastic force in a direction of inserting the housing 210 into the console body 10.

As such, when the second storage assembly 200 is inserted into the console body 10 so as to be held in the console body 10, the front and side surfaces of the housing 210 form the outer surface of the console body 10.

Figure 4:
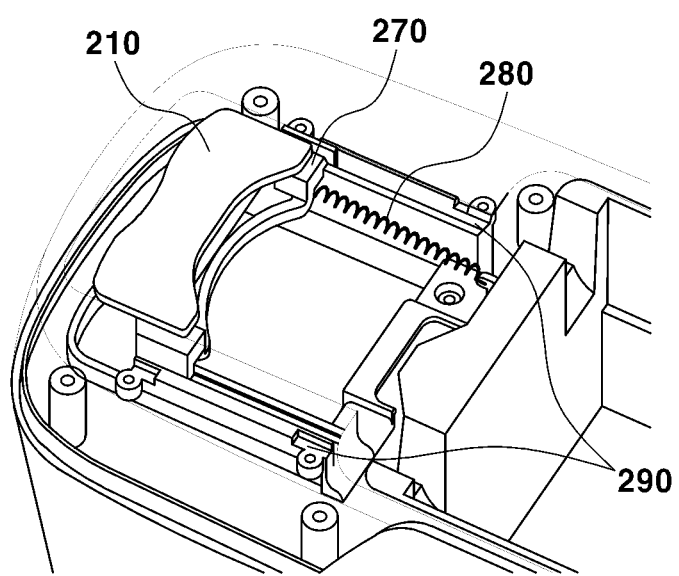
FIG. 4 is a schematic view illustrating the configuration of a first support in the state in which the second storage region of the console according to one embodiment of the present invention is held in the console body.

FIG. 4 is a schematic view illustrating coupling relations between the first support 220 and the elastic members 280 in the state in which the second storage assembly 200 is inserted into the console body 10.

When the housing 210 is inserted into the console body 10, the elastic members 280 engaged with the first support 220 maintain the stretched state thereof, and the first support 220 is moved to a position adjacent to the first storage region 110. More particularly, the position of the first support 220 held in the console body 10 may vary according to the modulus of elasticity of the elastic members 280.

In the state in which the housing 210 is held in the console body 10, the protrusions located at both sides of the first support 220 are located at the front ends of the guide parts 290. Because the protrusions of the first support 220 are located at the guide parts 290, the guide parts 290 are moved in response to the first movement of the housing 210 in the withdrawal direction thereof and then, when the protrusions come into contact with the rear ends of the guide parts 290, the housing 210 and the first support 220 are simultaneously moved in the withdrawal direction of the housing 210.

Figure 5:
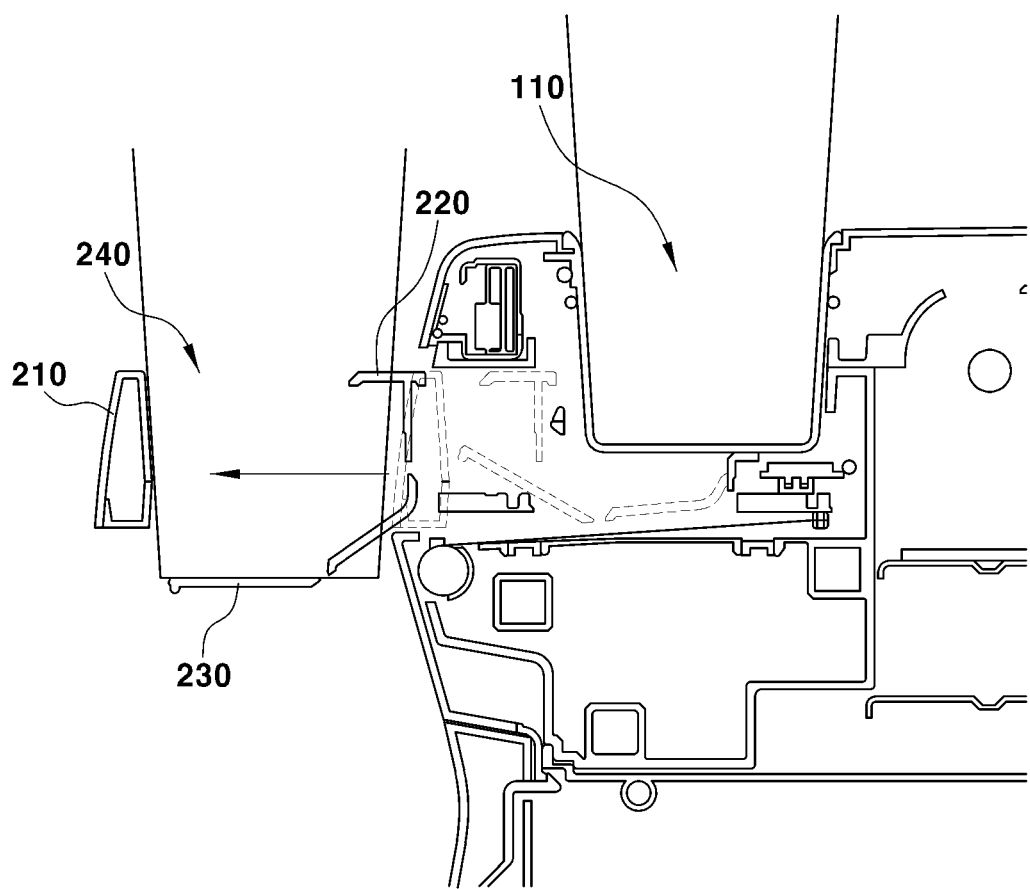
FIG. 5 is a cross-sectional view illustrating the state in which the second storage region of the console according to one embodiment of the present invention is deployed.
Figure 6:
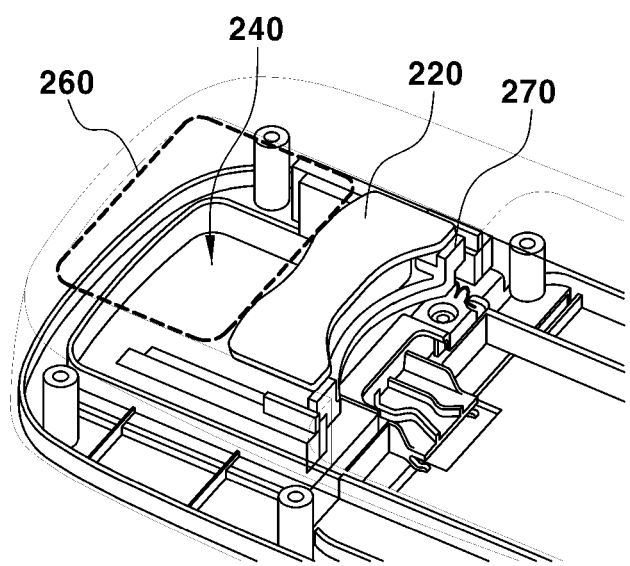
FIG. 6 is a schematic view illustrating the configuration of the first support in the state in which the second storage region of the console according to one embodiment of the present invention is deployed.

FIG. 5 is a cross-sectional view illustrating the state in which the second storage assembly 200 is deployed outwards from the console body 10, and FIG. 6 is a schematic view illustrating the first support 220 located at the rear end of the second storage region 240.

The housing 210 is configured to be opened due to the driving force of the driving unit by receiving an electronic signal in response to a user's request, or to be withdrawn and then to be deployed forward in the length direction of the console body 10 in response to a user's manual input. In one embodiment of the present invention, if the housing 210 is withdrawn in the length direction of the console body 10 in response to a user's manual input, the push/pull-type button 400 located inside the console body 10 and an engagement part fixed to the inner surface of the console body 10 in the state in which the housing 210 is completely deployed may be provided on the rear surface of the housing 210. Moreover, the push/pull-type button 400 may be configured to be engaged with the rear end of the housing 210 so as to be operated due to contact with the inner wall of the console body 10.

The housing 210 is configured to be deployed forward along the rails 250 located on the inner surface of the console body 10 so as to expose the second storage region 240. The second storage region 240 means an opening surrounded by the outer wall of the housing 210, and the lower surface of the opening may be supported by the second support 230.

The second storage region 240 may be formed in a cylindrical shape, and more particularly, in one embodiment of the present invention, may be formed in an inverted conical shape. Furthermore, a fixing part 300 located along the inner surface of the second storage region 240 may be further provided, and the fixing part 300 serves to fix an article inserted into the second storage region 240.

When the housing 210 is initially moved along the console body 10 in the withdrawal direction, the first support 220 is located inside the console body 10, and the guide parts 290 located in the housing 210 are moved integrally with the housing 210 in the state in which the guide parts 290 surround the protrusions of the first support 220. Thereafter, the rear ends of the guide parts 290 face the protrusions of the first support 220, and the housing 210 and the first support 220 are integrally moved forward from the console body 10. Therefore, the movement distance of the first support 220 is shorter than the movement distance of the housing 210 in the withdrawal direction thereof. Thereby, the insertion part 260 formed at the upper end of the second storage region 240 may have a width corresponding to the movement distance of the housing 210 at maximum.

That is, because the width of the insertion part 260 of the second storage region 240 is determined as a distance from the upper end of the housing 210 to the first support 220, the insertion part 260 is configured such that the width of the insertion part 260 when the housing 210 is deployed is greater than the distance from the upper end of the housing 210 to the first support 220 when the housing 210 is inserted into the console body 10.

The width of the insertion part 260 of the second storage region 240 is defined as shown in FIG. 6.

The insertion part 260 of the second storage region 240 formed by deploying at least a portion of the housing 210 is configured to fix an article loaded therein through the first support 220 and the fixing part 300, and the first support 220 may be engaged with a link part 270 located on the rear surface of the upper end of the housing 210 so as to be rotated. Further, the link part 270 and the first support 220 are connected by springs, and thus, when the first support 220 is rotated downward about the link part 270, the springs apply elastic force to the first support 220 in a direction of restoring the first support 220 to the original position thereof.

Further, the height of the uppermost end of the second storage region 240 formed by deploying at least a portion of the housing 210 is substantially the same as the height of the center of the first storage region no in the height direction thereof.

As is apparent from the above description, a console having a multi-storage configuration according to embodiments of the present invention provides the following effects through the above-described configuration and connection and usage relations.

The console according to embodiments of the present invention provides a second storage region which may be deployed in a narrow space, thereby being capable of improving user convenience.

Further, the console according to embodiments of the present invention provides the second storage region which may be located in a console body so as to be deployed, thereby being capable of improving spatial efficiency.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents. That is, while the invention has been explained in relation to embodiments thereof, it is to be understood that various modifications thereof will become apparent to those skilled in the art upon reading the specification. These embodiments have been described to explain the best mode to implement the technical scope of the invention, and various modifications required in the specific application and purpose of the present invention are possible. Therefore, the above detailed description of embodiments of the present invention is not intended to limit the invention. Further, it must be interpreted that the accompanying claims encompass other modes.

What is claimed is:

1. A console having a multi-storage configuration, the console comprising:
   a console body configured to be disposed inside a vehicle;
   a first storage assembly located in the console body;
   a second storage assembly held in the console body and configured to be withdrawn by deploying at least a portion of the console body, wherein the second storage assembly comprises:
      a housing comprising at least one surface of the console body and configured to be deployed to form a second storage region;
      a first support located at an upper end of the second storage region; and
      a second support configured to be deployed in an extension direction of the second storage region, and
   guide parts located inside the housing and configured to move the first support in response to movement of the housing.

2. The console of claim 1, wherein, when the housing is moved in a withdrawal direction from the console body, the housing is configured to be moved to a designated position, and thereafter, the first support faces rear ends of the guide parts and is configured to then move integrally with the housing.

3. The console of claim 1, wherein, when the housing is inserted into the console body to be held in the console body, the first support faces front ends of the guide parts.

4. The console of claim 1, further comprising elastic members located between a rear surface of the first support and an inner surface of the console body.

5. The console of claim 1, wherein the second support is configured to be inserted into the second storage region when the second storage assembly is inserted into the console body to be held in the console body.

6. The console of claim 1, further comprising a link part located between one end of an upper portion of the housing and a rear end of the first support and configured to rotate the first support.

7. The console of claim 1, further comprising a fixing part located inside the housing and protruding towards an inside of the second storage region.

8. The console of claim 1, wherein the second support is located adjacent to a lower end of the first storage assembly when the second storage assembly is inserted into the console body to be held in the console body.

9. The console of claim 1, wherein the first support is located adjacent to side surfaces of the first storage assembly when the second storage assembly is inserted into the console body to be held in the console body.

10. The console of claim 1, wherein, when the housing is deployed, a movement distance of the second support in a withdrawal direction of the housing from the console body is longer than a movement distance of the first support in the withdrawal direction of the housing from the console body.

11. The console of claim 1, further comprising rails located inside the console body in a deployment direction of the housing, wherein at least a portion of each side surface of the housing is inserted into a corresponding one of the rails.

12. The console of claim 1, further comprising a push/pull-type button located on a rear surface of the housing or an inner surface of the console body configured to contact the rear surface of the housing.

13. The console of claim 1, wherein the second support is configured to be deployed towards a lower end of the second storage region in response to movement of the housing in a withdrawal direction from the console body.

14. The console of claim 1, wherein the housing comprises:
   an upper housing part forming at least a portion of an outer surface of the console body and configured to surround the second storage region formed by deploying at least a portion of the housing; and
   a lower housing part configured to move along an inside of the console body and having the first support and the second support located thereon.

15. The console of claim 1, wherein the first storage assembly comprises an indented area comprising an opening formed in an upper surface of the console body.

16. A console having a multi-storage configuration, the console comprising:
   a console body configured to be disposed inside a vehicle;
   a storage assembly held in the console body and configured to be withdrawn by deploying at least a portion of the console body, wherein the storage assembly comprises:
      a housing comprising at least one surface of the console body and configured to be deployed to form a storage region;
      a first support located at an upper end of the storage region;
      guide parts located inside the housing and configured to move the first support in response to movement of the housing; and a second support configured to be deployed towards a lower end of the storage region in response to movement of the housing in a withdrawal direction from the console body.

17. A vehicle comprising:

a console disposed inside the vehicle, wherein the console comprises:
   a first storage assembly located in a console body;
   a second storage assembly configured to be held in the console body and withdrawn from the console body by deploying at least a portion of the console body, wherein the second storage assembly comprises:
      a housing comprising at least one surface of the console body and configured to be deployed to form a second storage region;
      a first support located at an upper end of the second storage region; and
      a second support configured to be deployed in an extension direction of the second storage region, and guide parts located inside the housing and configured to move the first support in response to movement of the housing.

18. The vehicle of claim 17, further comprising:

elastic members located between a rear surface of the first support and an inner surface of the console body; and a link part located between one end of an upper portion of the housing and a rear end of the first support and configured to rotate the first support.

19. The vehicle of claim 17, further comprising:

a fixing part located inside the housing and protruding towards an inside of the second storage region; and rails located inside the console body in a deployment direction of the housing, wherein at least a portion of each side surface of the housing is inserted into a corresponding one of the rails.

* * * * *